United States Patent [19]  
Heymsfield et al.

[11] 4,257,107  
[45] Mar. 17, 1981

[54] MEASURING DEVICE

[76] Inventors: Steven B. Heymsfield, 1942 N. Decatur Rd., Atlanta, Ga. 30307; Michael J. Sinclair, 2360 Clyde Dr., Chamblee, Ga. 30341

[21] Appl. No.: 908,439

[22] Filed: May 22, 1978

[51] Int. Cl.³ .................................................. G01B 3/08
[52] U.S. Cl. ..................................... 364/560; 364/562; 33/140; 33/148 H
[58] Field of Search ............................... 364/560–562, 364/571; 235/92 DN, 92 PE, 92 CP, 92 MT; 33/121–124, 125 M, 125 R, 125 C, 133, 137 R, 137 L, 140, 141 R, 142, 143 L, 143 R, 147 N, 148 R, 148 H, 149 R; 242/84.8; 324/74, 140 D, 140 R, 130, 83 D, 99 D

[56] References Cited  
U.S. PATENT DOCUMENTS

| | | | |
|---|---|---|---|
| 2,296,104 | 9/1942 | Handley | 33/125 R |
| 2,875,524 | 3/1959 | Bower et al. | 33/125 C |
| 2,886,892 | 5/1959 | Banfill | 33/148 H |
| 3,024,396 | 3/1962 | Peckjian | 318/576 |
| 3,058,225 | 10/1962 | Ward | 33/172 E |
| 3,276,131 | 10/1966 | Hahn | 33/147 N |
| 3,942,895 | 3/1976 | Myer et al. | 365/169 |
| 3,973,326 | 8/1976 | Gallacher et al. | 33/1 M |
| 3,987,552 | 10/1976 | Raiteri | 33/178 E |
| 4,031,360 | 6/1977 | Soule, Jr. | 235/92 DN |
| 4,035,922 | 7/1977 | Von Voros | 33/143 L |
| 4,095,273 | 6/1978 | Gonzalez | 364/705 |
| 4,104,578 | 8/1978 | Thuot | 324/140 R |
| 4,158,229 | 6/1979 | Woo, Jr. et al. | 364/562 |
| 4,181,848 | 1/1980 | Iwase | 235/92 DN |
| 4,181,959 | 1/1980 | Tateishi | 364/562 |
| 4,181,960 | 1/1980 | Tateishi et al. | 235/92 DN |
| 4,195,348 | 3/1980 | Kakutani | 364/562 |

Primary Examiner—Charles E. Atkinson  
Assistant Examiner—Gary Chin  
Attorney, Agent, or Firm—Beveridge, DeGrandi, Kline & Lunsford

[57] ABSTRACT

A measuring device for measuring the value represented by an indication on a graph, chart, map, or the like, having a calibration scale. The measuring device can accommodate any calibration scale over a wide range. The measuring device includes a first member, having a first reference indication on it, and a second member, having a second reference indication on it. The second member is movable with respect to the first member between a closed position, in which the two reference indications are adjacent each other, and an extended position, in which the two reference indications are separated. A first voltage signal, indicative of the separation of the first and second members, is applied to a ratiometric digital voltmeter which also receives as an input a second voltage signal determined by the setting of a manually adjustable control. The ratiometric digital voltmeter provides an output signal that is indicative of the ratio of its two input voltages, and this output is indicated on a digital display unit. In use, the two reference indications are placed at the two ends of the calibration scale indication of the graph, chart, map, or other such paper, to apply to the ratiometric digital voltmeter a first voltage signal indicative of that calibration scale indication, and the manually adjustable control is adjusted until the calibration value represented by that calibration scale indication is shown on the digital display unit. The two reference indications are then placed at the two ends of the indication to be measured, and the ratiometric voltmeter output, shown on the digital display unit, then represents that measured value.

8 Claims, 7 Drawing Figures

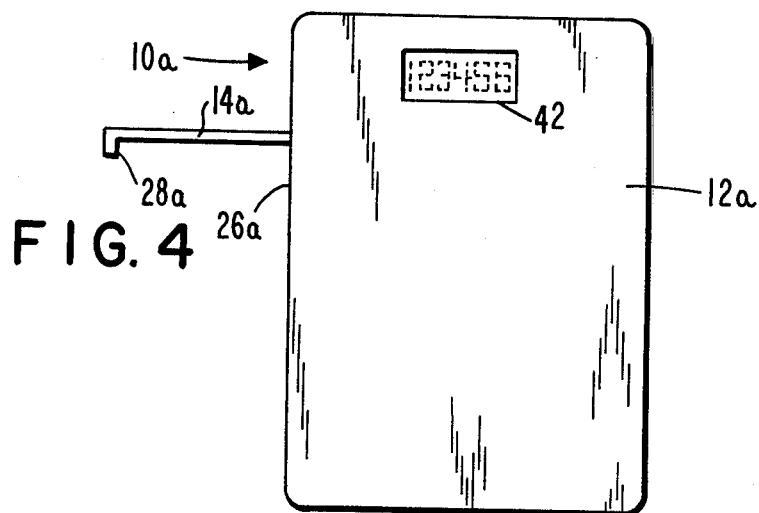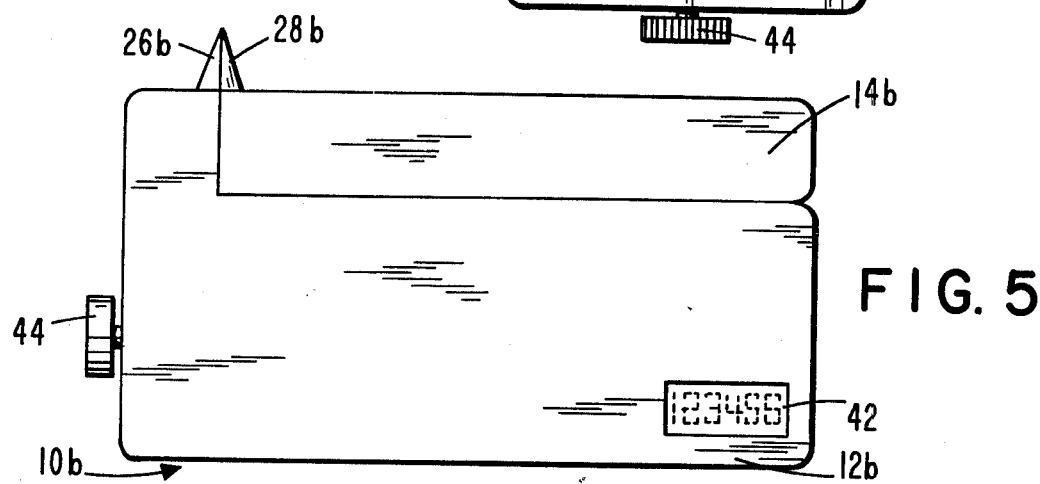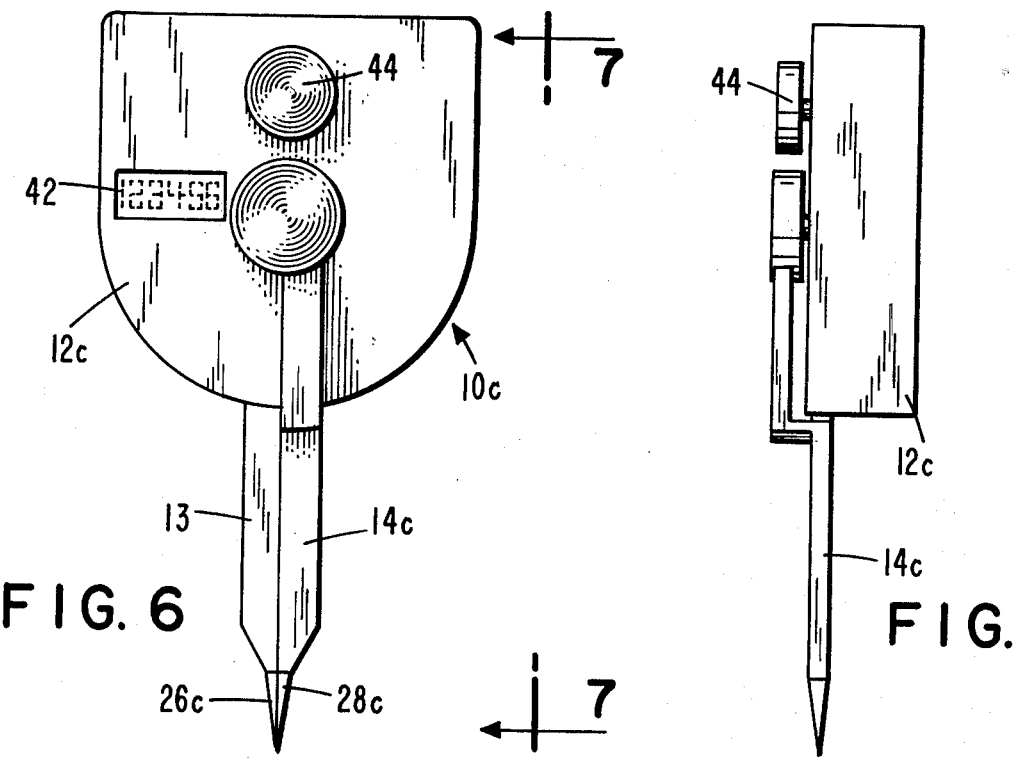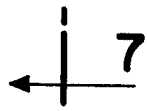

MEASURING DEVICE

BACKGROUND OF THE INVENTION

The present invention pertains to a measuring device. More particularly the present invention pertains to a device for measuring a distance on a graph, chart, map, or similar paper to enable rapid determination of a value represented by an indication on the paper.

Many procedures involve the determination of a value represented by an indication on a chart, graph, map, or other such paper. The magnitude of this value is dependent, in part, on the scale or calibration of the paper. By way of illustration, in a number of medical procedures a graph or similar representation of a physical phenomenon is obtained and must be analyzed to enable evaluation of a patient's condition. A typical example is the reading of an echocardiogram, the tracing of waveforms resulting from bouncing sound waves off the heart. Electrical signals resulting from the sound waves are applied to a cathode ray tube display device, and an appropriate display is generated. The scale, calibration, or magnification of the display may be varied by means of controls on the cathode ray tube display device until a suitable display is obtained. Calibration scale markings may be displayed on the screen in addition to the echocardiogram display. When the display on the screen is satisfactory, a hard copy of it can be obtained, for example by photographing the screen or by use of a recorder in conjunction with the cathode ray tube display device. The values of various points on the echocardiogram display can then be determined by comparison with the calibration scale indication. Since the final adjustment of the magnification of the echocardiogram is seldom the same for any two displays, this determination requires individual measurement of the calibration scale and of the echocardiogram and then calculation of the values represented by the echocardiogram.

As a second example, in many engineering operations blueprints must be read. Often a distance must be determined by measurements on the blueprints. The distance then depends upon the scale of the blueprint. Accordingly, to determine the distance, both the scale calibration of the blueprint and the measured distance must be known.

Similarly, determining a distance on a road map requires knowing both the calibration value for the road map and the measured distance on the road map so as to determine the measured value or the actual distance.

Various devices have been developed in the past for determination of a value on a chart, graph, map, or other such paper having a scale which might vary from one such paper to another. U.S. Pat. No. 2,296,104 shows a device for reading distances on such a paper. The device is placed over the paper, and racks on the device are extended to move pointers over the distance to be measured. The measurement is then indicated on mechanical dials. These dials can be changed by removing one set and installing a second set to change the scale of the device. This patent also shows a variation of the device in the form of a retractable tape measure having the readout dial attached to one face of the casing within which the tape retracts.

U.S. Pat. No. 3,973,326 shows a device for measuring distances on graphs, charts, maps, and the like. The paper on which the measurement is to be made is placed upon a table with one end of the distance to be measured adjacent one arm of a T-square. The distance is then measured by movement of a cursor on the other arm of the T-square. The cursor is connected in an electrical circuit, the resistance of which is dependent upon the cursor position. The output of this circuit is applied to a digital voltmeter which thus provides a reading indicative of the measured distance. No means is shown for changing the scale of the measurement.

U.S. Pat. No. 3,058,225 shows an instrument for determining the depth of a recess within a tooth or other body. A probe is retractable within a sleeve. The end of the sleeve is positioned adjacent the recess to be measured, and the probe is then extended. Circuitry within the device provides an indication on a meter of the extent to which the probe has been extended. No scale changing technique is shown.

U.S. Pat. Nos. 3,024,396 and 3,987,552 show measuring devices in which a position is indicated by the resistance of a variable resistor incorporated into the device. U.S. Pat. Nos. 2,875,524, 3,276,131, 3,942,895, and 4,035,922 show other forms of measuring devices in which a position is indicated by the magnitude of an electrical characteristic in a circuit. U.S. Pat. No. 2,886,892 shows an electrical caliper device in which a distance is measured and the measurement of that actual distance is indicated on a scale in accordance with the resistance of a rheostat controlled by the measuring calipers.

None of these prior art devices, however, permits rapid and accurate determination of a value represented by an indication on a chart, graph, map, or other such paper on which the scale may vary. Thus, while various ones of these prior art devices may permit determination of an actual distance measured on a paper, and others of the devices may permit determination of a value represented by an indication on such a paper, none is suitable for use in applications for which the scale of the paper may vary, such as in the reading of echocardiograms, blueprints, or maps. While U.S. Pat. No. 2,296,104 does show a device for reading values represented by indications on a chart, graph, map, or the like, with various scales being accommodated, still that device is unsuitable for many such applications, including the reading of echocardiograms. To change the scale of that device, the dials on the device must be removed and replaced. This is a cumbersome and time consuming operation, and requires the keeping of numerous sets of dials. Even then, only a limited number of scales can be accommodated, and in many applications, for example the reading of echocardiograms, it is desirable to have a device having an infinitely variable scale.

U.S. patent application Ser. No. 908,440, now abandoned, (Attorney's Docket No. 80412), filed of even data herewith by Steven B. Heymsfield, discloses a measuring device for measuring the value represented by an indication on a graph, chart, map, or the like, having a scale and in which the measuring device can accommodate any calibration scale over a wide range. The measuring device of that patent application includes a first member, with a first reference indication on it, and a second member, with a second reference indication on it. The second member is movable with respect to the first member between a closed position, in which the two reference indications are adjacent each other, and an extended position, in which the two reference indications are separated. The first and second members are coupled to a microprocessor having a keyboard. The microprocessor is programmed to be responsive to a first actuation of the keyboard to determine a calibration value, indicative of the extent to which the first and second reference indications are separated at the time of that first actuation, and to be responsive to a second actuation of the keyboard to determine a measured value, indicative of the calibration value multiplied by the ratio of the extent to which the two reference indications are separated at the time of the second keyboard actuation to the extent to which the two reference indications are separated at the time of the first keyboard actuation. This measured value is indicated on a display on the measuring device. The measuring device disclosed in U.S. Pat. application Ser. No. 908,440, now abandoned, can be provided in a compact size, easily fitting within a pocket, and is capable of rapidly and accurately determining and indicating the value represented by an indication on a paper having a calibration scale and is suitable for numerous uses, including use by a doctor in evaluating an echocardiogram or other such indication of a patient's physical condition. Nevertheless, that measuring device is relatively costly to produce. The microprocessor is a comparatively expensive assembly, incorporating a central processing unit, a program memory, and a working memory. These components, as well as the keyboard, require a certain amount of space, limiting the compactness of the device.

SUMMARY OF THE INVENTION

The present invention is a measuring device for measuring the value represented by an indication on a graph, chart, map, or the like, having a scale and in which the measuring device can accommodate any calibration scale over a wide range. The measuring device in accordance with the present invention includes a first member, with a first reference indication on it, and a second member, with a second reference indication on it. The second member is movable with respect to the first member between a closed position, in which the two reference indications are adjacent each other, and an extended position, in which the two reference indications are separated. The measuring device further includes calibration means for determining a calibration value indicative of the value of a scaled calibration distance on the chart, graph, map, or other such paper, and measuring means for determining a measured value which is indicative of the previously determined calibration value multiplied by the ratio of the extent to which the two reference indications are separated at the time the measured value is determined to the extent to which the two reference indications are separated at the time the calibration value is determined. The measuring device further includes a display unit for displaying the measured value.

In a preferred form of the present invention the measuring means includes a ratiometric digital voltmeter which provides an output signal indicative of the ratio of two input voltages. A first input voltage is applied to the ratiometric voltmeter indicative of the extent to which the two reference indications are separated. A second input voltage to the voltmeter is determined by the setting of a manually adjustable control. To measure the value represented by an indication on a graph, chart, map, or other such paper having a scale, the two reference indications are placed at the two ends of the calibration scale indication on the paper, applying to the ratiometric digital voltmeter a first input voltage $E_c$ indicative of the distance $D_c$ by which the two reference indications are separated, $E_c = KD_c$. The manual control is then adjusted to adjust the second input voltage, $E_s$, applied to the voltmeter until the voltmeter output, as indicated on the display unit, represents the calibration scale value $V_c$. $V_c = E_c/E_s = KD_c/E_s$. Thus, $E_s = KD_c/V_c$. Next, the two reference indications are placed at the two ends of the indication to be measured, applying as the first input to the ratiometric voltmeter a voltage $E_m$ indicative of the measured distance $D_m$ by which the two reference indications are then separated. $E_m = KD_m$. The ratiometric voltmeter output, shown on the display unit, then indicates the value $V_m$ represented by the measurement. $V_m = E_m/E_s = KD_m/E_s = V_cD_m/D_c$. Therefore, the measured value $V_m$ equals the calibration value $V_c$ multiplied by the ratio of $D_m$, the extent to which the two reference indications are separated at the time the measured value is determined, to $D_c$, the extent to which the two reference indications are separated at the time the calibration value is determined.

BRIEF DESCRIPTION OF THE DRAWINGS

These and other aspects and advantages of the present invention are more apparent in the following detailed description and claims, particularly when considered in conjunction with the accompanying drawings in which like parts bear like reference numerals. In the drawings:

FIGS. 4, 5 and 6 are front views of alternative embodiments of a measuring device in accordance with the present invention; and FIG. 7 is a side elevational view of the device of FIG. 6, taken along lines 7—7 of FIG. 6.

DETAILED DESCRIPTION OF THE INVENTION

Figure 1:
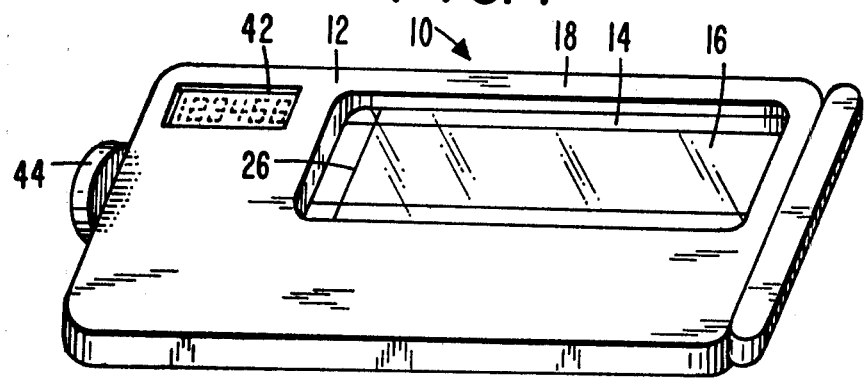
FIG. 1 is a perspective view of a first embodiment of a measuring device in accordance with the present invention.
Figure 2:
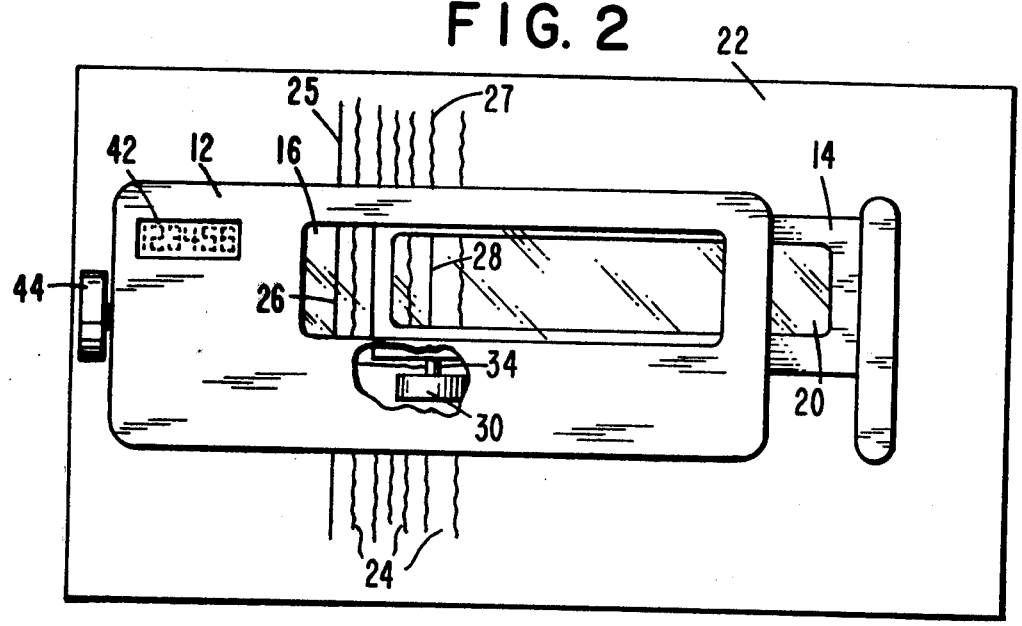
FIG. 2 is a plan view, partially broken, of the measuring device of FIG. 1, illustrating use of such a device.

FIGS. 1 and 2 depict one embodiment of a measuring device 10 in accordance with the present invention. Measuring device 10 includes an outer casing 12 and an inner slide member 14. Casing 12 has a transparent window 16 in both its upper surface 18 and its lower surface, and slide member 14 has a transparent window 20 within it. As a consequence, as depicted in FIG. 2, when measuring device 10 is placed on a chart, graph, map, or other such paper 22 to enable the measuring of distances thereon, the paper 22 and the markings 24 thereon can be seen through measuring device 10.

A first index line 26 is marked on one of the windows 16 of casing 12. A second index line 28 is marked on window 20 of slide 14. When slide 14 is fully retracted within casing 12, as depicted in FIG. 1, index lines 26 and 28 overlie one another. When slide 14 is partially extended from casing 12, as depicted in FIG. 2, each index line 26 and 28 is visible, and paper 22 and the markings 24 thereon are visible through windows 16 and 20. Consequently, measuring device 10 can be positioned over paper 22, having thereon indication lines 25 and 27 representing the distances to be measured, with index line 26 overlying one of the indication lines, depicted in FIG. 2 as line 25, and with index line 28 overlying the other indication line, depicted in FIG. 2 as line 27. The extent to which index lines 26 and 28 are separated thus represents the indication or distance to be measured on paper 22.

Figure 3:
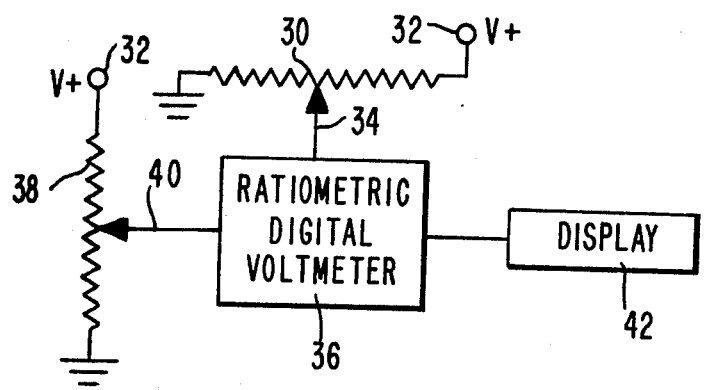
FIG. 3 is a block diagram of circuitry suitable for incorporation into a measuring device in accordance with the present invention.

FIG. 3 illustrates circuitry which is suitable for use in this form of measuring device 10 in accordance with the present invention and which can be provided within casing 12. Rheostat 30 is coupled between voltage source 32 and ground. Moving contact 34 of rheostat 30 is connected to the first input of ratiometric digital voltmeter 36. Rheostat 38 is coupled between voltage source 32 and ground, and its moving contact 40 is connected to the second input of ratiometric digital voltmeter 36. Voltmeter 36 provides an output signal indicative of the ratio of the voltage applied to its first input, by moving contact 34 of rheostat 30, to the voltage applied to its second input, by moving contact 40 of rheostat 38. This output from ratiometric digital voltmeter 36 is applied to display unit 42 which provides a visible display of the ratio. As depicted in FIGS. 1 and 2, display unit 42 is preferably a digital display such as a liquid crystal display or a light emitting diode display.

As seen in FIG. 2, rheostat 30 is positioned within casing 12 to extend adjacent the cavity within which slide 14 is received, and moving contact 34 is attached to slide 14 so that the position of contact 34 on rheostat 30 is directly dependent upon the extent to which slide 14 is withdrawn from casing 12. Accordingly, the voltage applied by moving contact 34 to the first input of ratiometric digital voltmeter 36 is indicative of the extent to which slide 14 is withdrawn from casing 12 and thus of the distance by which index line 28 is separated from index line 26. Rheostat 38 is likewise positioned within casing 12 and has its moving contact 40 connected to control knob 44 so that the position of moving contact 40 on rheostat 38, and thus the voltage applied to the second input of ratiometric digital voltmeter 36, is dependent upon the adjustment of control knob 44.

To determine a distance on a chart, graph, map or other such paper, measuring device 10 is first calibrated in accordance with the scale of the paper. Thus, measuring device 10 is positioned on the scale indication for the paper so that index line 26 overlies the zero position of the scale indication, and slide 14 is withdrawn from casing 12 until index line 28 overlies the full scale position of the scale indication. Index lines 26 and 28 are then separated by the scaled calibration distance $D_c$, and moving contact 34 of rheostat 30 then applies a voltage $E_c$ representative of this calibration distance, to the first input of ratiometric digital voltmeter 36. The calibration voltage $E_c$ is related to the calibration distance $D_c$; thus, $E_c = KD_c$. Next control knob 44 is adjusted to adjust the voltage $E_s$ applied by moving contact 40 of rheostat 38 to the second input of ratiometric digital voltmeter 36 until the output from voltmeter 36, as indicated on display 42, corresponds with the calibration value $V_c$ represented by the scaled calibration distance $D_c$, as shown on the scale or other calibration indication for the chart, graph, map, or other paper. The voltmeter output is determined by the ratio of its two input voltages; thus, $V_c = E_c/E_s = KD_c/E_s$, and so $E_s = KD_c/V_c$. With control knob 44, and thus moving contact 38, remaining unchanged, measuring device 10 is then positioned over the distance to be measured on the paper, as depicted in FIG. 2. While index line 26 overlies the marking 25 or other indication of one end of the distance to be measured, slide 14 is moved so that index line 28 overlies the marking 27 or other indication of the second end of the distance to be measured. Index lines 26 and 28 are then separated by the distance $D_m$ to be measured, and moving contact 34 of rheostat 30 applies a voltage $E_m = KD_m$ to the first input of ratiometric digital voltmeter 36. The output from voltmeter 36, therefore, corresponds with the measured value $V_m$ represented by that distance, and this measured value is displayed on display unit 42. Since $V_m = E_m/E_s = KD_m/E_s$, then $V_m = V_c D_m/D_c$, or the measured value equals the calibration value multiplied by the extent to which index line 28 is separated from index line 26 at the time the measured value $V_m$ is determined to the extent to which the two index lines 26 and 28 are separated at the time the calibration value $V_c$ is determined.

FIG. 4 illustrates another embodiment of a measuring device 10a in accordance with the present invention in which a retractable tape 14a is coiled within a casing 12a, similar to a retractable tape measure. When tape 14a is retracted within casing 12a, index end 28a of the tape is adjacent index edge 26a of casing 12a. Tape 14a can be withdrawn from this coiled position within casing 12a to measure the distance to be determined. As tape 14a is withdrawn, the extent to which it is withdrawn, and thus the separation between index members 26a and 28a, is determined, and a voltage indicative thereof is applied as an input to ratiometric digital voltmeter 36. Thus, withdrawal of tape 14a can cause movement of a sliding contact on a rheostat or other electrical component. Alternatively, indicia can be provided along the length of tape 14a to be automatically read and converted to a voltage level as the tape is withdrawn from and retracted into casing 12a. By way of example, such indicia might be magnetic, to be detected by a magnetic read head past which the indicia pass during withdrawal or retraction of tape 14a, with the magnetic read head output applied, through a digital-to-analog converter if necessary, to the first input of ratiometric digital voltmeter 36. Display 42, control knob 44, and rheostat 38 with its moving contact 40 applied to the second input of voltmeter 36 are provided, just as in the embodiment of FIG. 1.

Similarly, FIG. 5 depicts an embodiment of a measuring device 10b including a casing 12b and a movable member 14b. An index pointer 26b extends from casing 12b, and a second index pointer 28b extends from movable member 14b. Movable member 14b is moved with respect to casing 12b so that index pointers 26b and 28b are separated by the distance to be measured. A rheostat can be provided within casing 12b, just as in the embodiment of FIG. 1, to convert this distance measurement to a signal to be applied to ratiometric digital voltmeter 36. Display 42 and control knob 44, with rheostat 38, function as in FIG. 1.

FIGS. 6 and 7 illustrate an embodiment of a measuring device 10c in the form of a caliper, in accordance with the present invention. Casing member 12c includes a fixed leg 13 having an index pointer 26c at its outer end. Movable leg 14c is pivotally connected to casing 12c and has an index pointer 28c at its outer end. Movable leg 14c is pivoted until index pointers 26c and 28c are separated by the distance to be measured. As movable member 14c is pivoted, a moving contact is moved on a rheostat within casing 12c to apply a signal to ratiometric digital voltmeter 36. Control knob 44, rheostat 38, and display 42 operate similar to the embodiment of FIG. 1.

While a rheostat 30 having a movable contact 34 has been disclosed as the electrical component which provides a signal indicative of the displacement between index member 26 and index member 28, other electrical components could be utilized. Thus, an inductive component, a capacitive component, a magnetic component, an optical component, or any other such component can be utilized to provide an electrical signal to ratiometric digital voltmeter 36 in accordance with the spacing between index member 26 and index member 28.

Components suitable for use as ratiometric digital voltmeter 36 are available in integrated circuit form and are sometimes referred to as digital panel meters or single chip digital voltmeters. One device suitable for use as ratiometric digital voltmeter 36 is available from Intersil, Inc. of Cupertino, California as its stock number 7106 integrated circuit.

A measuring device in accordance with the present invention provides ready and accurate measurement of distances on charts, graphs, maps, or other such papers, regardless of the scale to which markings on those papers are drawn. Additionally, the measuring device of the present invention can be provided of a size to fit conveniently within the pocket of the user. Thus, for example, a doctor wishing to read medical charts, such as echocardiograms, can readily do so. Likewise, an engineer can readily determine distances on a blueprint or other such drawing. Numerous similar applications can be accommodated.

Although the present invention has been described with reference to preferred embodiments, numerous modifications and rearrangements might be made, and still the result would be within the scope of the invention.

What is claimed is:

1. A measuring device comprising:
   a first member having a first reference indication;
   a second member having a second reference indication and movable with respect to said first member between a closed position, in which said first and second reference indications are adjacent each other, and an extended position, in which said first and second reference indications are separated;
   variable control means for generating a first analog voltage as a calibration voltage;
   generating means coupled to said first member and said second member for generating a second analog voltage as a representation of the extent to which said second reference indication is separated from said first reference indication;
   calculating means coupled to said variable control means to receive the first analog voltage therefrom and coupled to said generating means to receive the second analog voltage therefrom for determining the ratio of said second analog voltage to said first analog voltage; and
   display means coupled to said calculating means for displaying the determined ratio.

2. A measuring device as claimed in claim 1 in which said variable control means comprises a rheostat.

3. A measuring device as claimed in claim 1 in which said first member comprises a casing having a first reference indication thereon and said second member comprises a movable member slidably movable with respect to said casing and having a second reference indication thereon and movable therewith.

4. A measuring device as claimed in claim 1 in which said first member comprises a casing having a first transparent window therein with a first reference line thereon, and said second member comprises a slide member having a second transparent window therein with a second reference line thereon and slidably receivable within said casing, said second transparent window positioned to be aligned with said first transparent window, with said second reference line aligned with said first reference line, when said slide member is fully retracted within said casing member.

5. A measuring device as claimed in claim 1 in which said first member comprises a casing and said second member comprises a tape retractably coiled within said casing and withdrawable therefrom.

6. A measuring device as claimed in claim 1 in which said first member and said second member are rotatably connected as a caliper.

7. A measuring device as claimed in claim 1 in which said calculating means includes a ratiometric digital voltmeter.

8. A measuring device comprising:
   a first member having a first reference indication;
   a second member having a second reference indication and movable with respect to said first member between a closed position, in which said first and second reference indications are adjacent each other, and an extended position, in which said first and second reference indications are separated;
   a first rheostat adapted for connection across a voltage source and having a control permitting manual adjustment of the setting thereof for providing a calibration voltage signal indicative of the setting thereof;
   a second rheostat including a resistance element connected to one of said first or second members and a moving contact connected to the other of said first or second members to provide a second voltage signal indicative of the position of the second member with respect to the first member;
   a ratiometric digital voltmeter having a first input coupled to said first rheostat and a second input coupled to said second rheostat for providing a digital signal indicative of the ratio of the second voltage signal to the first voltage signal; and
   display means coupled to said ratiometric digital voltmeter for displaying the digital signal.

* * * * *